Patented Sept. 7, 1948

2,449,026

UNITED STATES PATENT OFFICE 2,449,026

PROCESS FOR PREPARING SALTS OF ALKYL PHENOL SULFIDES

Carll F. Van Gilder, Roselle, N. J., assignor to Standard Oil Development Company, a corporation of Delaware No Drawing. Application April 20, 1944, Serial No. 531,992

6 Claims. (Cl. 260—609)

This invention relates to an improved process of preparing or improving metal derivatives of alkyl phenols or their derivatives, as well as to the products thus prepared and to uses thereof. As a specific instance, the invention relates to the improvement of chemical compounds such as the barium salt of diisobutyl (i. e., tertiary isooctyl) phenol or of the corresponding sulfide or other derivative thereof.

Chemical compounds of the class just referred to have been used as lubricating oil additives, particularly in heavy duty oils used for lubricating high speed Diesel and gasoline engines, for the reason that these additives have excellent detergent properties and improve the performance of the lubricant. They do, however, possess to some extent the undesirable property of being water-sensitive, that is when contacted with a small amount of water, they form a sludge which may remain emulsified in the oil or settle out as a flocculent precipitate. This characteristic of the additive, while not affecting the performance of the oil, is nevertheless undesirable in certain respects such as in storage or handling where the oil is apt to become contaminated with water.

The primary object of the present invention is therefore to treat such additives during the process of manufacture in order to render them water-insensitive so that lubricating oils, or other products in which they may be used, will not tend to emulsify or form sludge when contacted with water.

Before discussing the particular improvement of this invention, the general manufacture of such products will be explained as applied, for example, to the treatment of alkylated hydroxy aromatic compounds, such as a tertiary octyl phenol with a sulfurizing agent, e. g. sulfur dichloride or sulfur monochloride, to form an alkyl hydroxy aryl sulfide which is then converted into a corresponding metal derivative by neutralization, preferably in oil solution, with a basic metal neutralizing agent such as barium hydroxide, thus forming a metal salt of an alkyl hydroxy aryl sulfide. Throughout this specification and the claims the word "sulfide" is used in a generic sense to include monosulfide, disulfide or polysulfide or mixtures of these. Such a process may be illustrated by the reaction of about 2 mols of tertiary octyl phenol with 1 mol, or a slight excess, of sulfur dichloride to produce tertiary octyl phenol sulfide. When preparing the alkyl phenol sulfides on a commercial scale, using technical grades of sulfur dichloride, ratios of 1.5 or so mols of $SCl_2$ to 2 mols of alkylated phenol will often be found desirable. (The tertiary octyl phenol is readily prepared by alkylating phenol with diisobutylene in the presence of suitable catalysts.) In practice the phenol sulfide is then usually dissolved in a suitable mineral lubricating oil base stock in about 25 to 50%, usually about 40%, concentration, with or without incorporation of lesser amounts of other additives such as higher aliphatic alcohols, e. g. stearyl alcohol, or aliphatic nitriles, etc., used as defoamers, plasticizers, mutual solvents or as detergency promoters, and finally this solution is neutralized with the desired basic metal compound such as barium hydroxide octahydrate or monohydrate. The resulting product, after filtration, is a mineral oil concentrate of barium tertiary octyl phenol sulfide. Barium tertiary octyl phenol monosulfide may be represented by the general formula

or, if the tertiary octyl group is assumed to be in a position para to the phenolic oxygen, and the sulfur linkage in a meta position, by the following graphic formula:

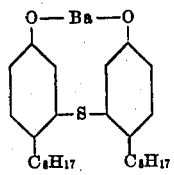

If the sulfur linkage is in an ortho position the graphic formula would be:

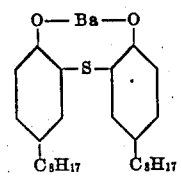

The exact location of the various radicals and linkages in such compounds has not been determined with certainty, but it is probable that the product resulting from the commercial operation of the described process is a mixture of compounds having the radicals and linkages in several different positions, there being for instance some tertiary octyl groups in an ortho position or even in a meta position unless the original tertiary octyl phenol used was an absolutely pure para compound. Also it is more than likely that the commercial product which may be given the general formula $Ba[O(C_8H_{17})C_6H_3]_2S_n$ where $n$ has an average value of at least 1.0 and less than 2.0, contains at least small amounts of disulfide and polysulfide compounds as well as some polymeric material. In any event corresponding compounds may readily be made by starting with ortho or meta alkyl phenols and mixed alkyl phenols may be used with alkyl groups in any two or more positions. If desired, dialkyl phenols may also be used such as 2,4-ditertiary butyl phenol, 2,4-diamyl phenol, 2,6-diamyl phenol, ditertiary octyl phenol, etc. For some purposes it may even be desirable to use alkyl hydroxy aryl compounds having more than two alkyl groups, but the monoalkylated products are preferred, particularly when the final product is desired to have greatest corrosion inhibiting properties.

The invention is considered to apply broadly to substituted metal phenolates or compounds containing at least one grouping having the general formula M—Y—Ar(X)$_n$ where M is a metal, Y is an element in the righthand side of group VI of the periodic table (Mendeleeff), Ar is an aromatic nucleus which contains like or unlike substituents, X, $n$ in number, replacing nuclear hydrogen, $n$ being at least one.

M may be any metal such as barium, calcium, aluminum, cobalt, chromium, magnesium, manganese, sodium, nickel, lead, tin, zinc, copper, iron, cadmium, potassium, lithium and the like, polyvalent metals being preferred.

The substituents, X, may be organic, inorganic, or both. For example, they may be alkyl radicals or groups containing one or more of the nonmetallic elements belonging to groups V, VI, and VII of the periodic system (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like, or they may be organic radicals containing one or more of the inorganic groups.

In the phenolate salts, if only one of the valences of a polyvalent is connected to a substituted phenolic radical, such as —O—Ar(X)$_n$, the other should be connected to other organic groups or to inorganic constituents. For convenience, non-phenolic radicals or groups, as well as phenolic groups, attached to the metal are indicated broadly by R in the following types of compositional formulae, which broadly represent metal derivatives of substituted phenolic compounds containing the characteristic compositional grouping described:

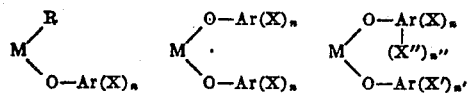

Where oxygen is shown in these formulae it may be replaced by sulfur, selenium or tellurium, as in the case of thiophenolic compounds.

More specifically, some of the structures which substituted divalent metal phenolates may have are indicated in the following list of formulae containing benzene nuclei of compositions —C$_6$H$_4$—, —C$_6$H$_3$—, etc., with X, as before, standing for nuclear substituents (e. g., —C$_n$H$_{2n+1}$, —NO$_2$, —Cl, —S—, —S$_2$—, —NH$_2$, —NH(C$_n$H$_{2n+1}$), etc.):

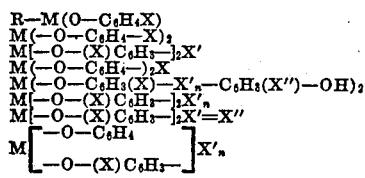

Corresponding monovalent metal derivatives would be:

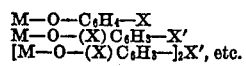

Similarly trivalent or other polyvalent metal derivatives may be used such as:

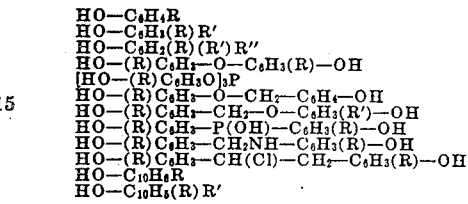

Corresponding metal derivatives of the following illustrative types of substituted phenolic compounds are among those that can be used, in which R represents an alkyl group, preferably having at least 4 carbon atoms.

Group A:

```
HO—C₆H₄R
HO—C₆H₃(R)R′
HO—C₆H₂(R)(R′)R″
HO—(R)C₆H₃—O—C₆H₃(R)—OH
[HO—(R)C₆H₃O]₃P
HO—(R)C₆H₃—O—CH₂—C₆H₄—OH
HO—(R)C₆H₃—CH₂—O—C₆H₃(R′)—OH
HO—(R)C₆H₃—P(OH)—C₆H₃(R)—OH
HO—(R)C₆H₃—CH₂NH—C₆H₃(R)—OH
HO—(R)C₆H₃—CH(Cl)—CH₂—C₆H₃(R)—OH
HO—C₁₀H₆R
HO—C₁₀H₅(R)R′
```

All these compounds when employed in high temperature lubrication service tend to corrode such sensitive engine parts as copper-lead and cadmium-silver bearings. This characteristic can usually be corrected by including, in the lubricating composition, suitable anti-oxidants or other anti-corrosion agents, e. g. benzyl para-amino phenol, alpha naphthol, tertiary amyl phenol sulfide, triphenyl phosphite, dibutyl amine, etc. It may be mentioned that metallic soaps of carboxylic acids are considerably more corrosive than the phenolic salts and that their corrosiveness is less amenable to correction by the use of antioxidants, etc.

However, this corrosion problem can also be at least partially and in most cases completely taken care of by chemically incorporating an element of the sulfur family (i. e., S, Se, and Te), sulfur itself being very effective, into the structure of the substituted phenolate metal salts, thus making unnecessary the addition of any separate anti-corrosion agent. Thus the metal derivatives of the following illustrative types of substituted phenolic compounds are preferred over those listed in group A above:

Group B:

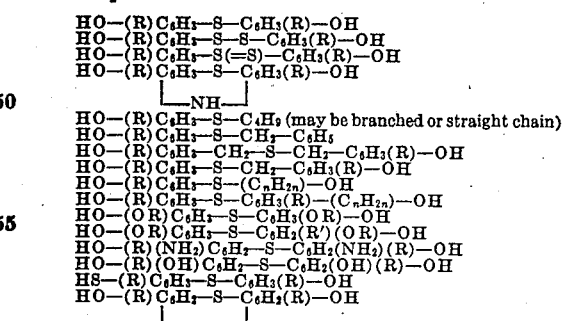

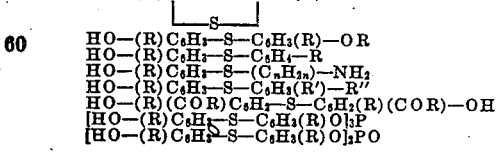

These preferred phenolates may also contain sulfur in other positions or groups at the same time as in the places shown in the formulae in group B. Furthermore, the formulae in group A may have sulfur incorporated therein. More broadly it may be stated that inorganic substituents, particularly negative inorganic groups containing non-metallic elements of groups V, VI, and VII of the Mendeleeff Periodic System, beneficially influence the phenolates by increasing their potency for stabilizing the lubricating oils and by making the phenolates, in themselves, more stable, as for instance, against hydrolysis.

Especially preferred, because they are both very efficient and also lend themselves to easy and economical manufacture, are compounds containing at least one grouping having the general formula:

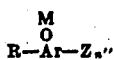

Where Ar is an aromatic nucleus, R is an organic group, Z is a member of the sulfur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkylenyl group, and preferably contains at least 4 carbon atoms but may contain many more, such as 8, 10, 16, 18, 24, etc.

The configurations of the compounds are not limited to certain positions for the substituent groups, for these may be in ortho, para, or meta relations to one another. Also, the substituents, X, in broader formulae discussed previously in any aromatic nucleus may be alike or different.

The aromatic nucleus may be polycyclic as in naphthalene, phenanthrene, diphenyl, etc. Where oxygen occurs, it may be replaced by sulfur, selenium, or tellurium, as in the case of thio-phenolic compounds.

An important feature of this invention issues from the observation that metal phenolates are benefited in solubility and effectiveness as hydrocarbon lubricating oil blending agents when they contain a total of at least 8 and preferably 10 or more carbon atoms per molecule in aliphatic groupings, when sulfur is present in the molecule, and at least 16 carbon atoms and preferably 18 or more, if no sulfur is present.

Specific examples of preferred substituted phenolates falling into the classes mentioned, having at least one alkyl radical as a substituent, and using barium as example of a suitable metal, are formulated as follows:

I. Alkyl phenolates

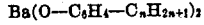

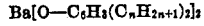

e. g., barium salts of diisobutyl phenol, (p. tert. octyl phenol), octadecyl phenol, and 2,4-ditertiary amyl phenol.

II. Alkyl chlorphenolates

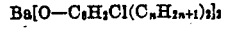

e. g., barium salts of 2 chloro, 4 octadecyl phenol, 2,6-dichloro, 4 diisobutyl phenol, and 6 chloro, 2,4-ditertiary amyl phenol.

III. Alkyl amino phenolates

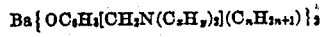

e. g., barium salts of dicyclohexyl amino methyl diisobutyl phenol.

IV. Thioethers of alkyl phenolates

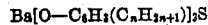

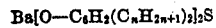

e. g., barium tertiary octyl phenol sulfide, barium tertiary amyl cresol sulfide, and barium 2,4-ditertiary amyl phenol sulfide.

V. Disulfides of alkyl phenolates

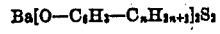

e. g., salts of tertiary amyl phenol disulfide.

VI. Phosphorus acid esters of alkyl phenol sulfides

e. g., salts of tertiary amyl phenol sulfide monophosphite.

Other examples of metal alkyl phenol sulfides which may be treated in accordance with the present invention include: calcium tertiary amyl phenol sulfide, tin salts of wax alkylated salicylic acid sulfide, magnesium tertiary octyl phenol sulfide, and barium salts of $C_{16}$—$C_{20}$ branched chain alkyl phenol sulfides prepared from phenols alkylated with refinery butene polymers, etc. An example of a trivalent metal alkyl phenol sulfide is aluminum tertiary amyl phenol sulfide which may be represented in a general way by the formula $[(C_5H_{11}—C_6H_3—O)_2S]_3Al_2$ which may be written out more in detail as follows:

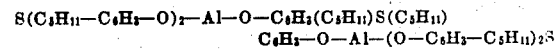

The alkyl hydroxy aryl compound should have more than three aliphatic carbon atoms and preferably more than 6, such as 8, 10, 12, etc., up to 24 or more as in the case of paraffinic radicals derived from paraffin wax or olefinic polymers, such as dimers, trimers, tetramers, etc., of isobutylene. Branched especially highly branched, alkyl radicals are preferred.

The aromatic nucleus of the alkyl hydroxy aryl compound may be mononuclear as in the case of a benzene nucleus or polynuclear as in the case of a naphthalene nucleus. Instead of using pure individual phenolic materials, one may use crude commercial products which may be mixtures of two or more alkyl hydroxy aryl compounds, such as crude petroleum phenols which have an average chemical composition indicating the presence of four aliphatic carbon atoms and an amount of oxygen slightly in excess of that called for by the formula $C_4H_9C_6H_4OH$. Similarly crude phenolic materials of coal tar origin may be used such as the so-called tri-cresol which is a mixture of isomeric ortho, meta and paracresols, which should, of course, be further alkylated with a higher alkyl group, for best results from an oil-solubility point of view.

In case of reaction of the alkyl hydroxy aromatic compound with a sulfurizing agent which is preferably a sulfur halide, e. g., $SCl_2$ or $S_2Cl_2$, a small amount of halogen may be found to combine with the aromatic compound in some unknown manner, but the proportion of such combined halogen is very small and is not objectionable.

Before carrying out the neutralization of the alkyl hydroxy aromatic compound for converting the latter into the corresponding metal derivative or salt, the alkylated phenol or sulfide or other derivative thereof is preferably dissolved in a lubricating oil base stock having a viscosity within the approximate limits of 35 to 70 seconds Saybolt at 210° F., and the oil derived from any suitable petroleum crude and having any desired viscosity index.

The basic metal neutralizing agent is preferably a finely divided oxide or hydroxide of the desired metal such as an alkaline earth metal, e. g. calcium, barium, magnesium, etc. or other polyvalent metals such as nickel, cobalt, tin, lead, zinc, copper, cadmium, manganese, iron, chromium, aluminum, etc., or even monovalent metals such as sodium, potassium, lithium, etc. Although the invention is intended to apply particularly to metal salts resulting directly from a basic metal neutralizing agent, it may be used to some advantage in the case of corresponding metal salts made by double decomposition from other corresponding metal salts. For instance, one may first prepare a sodium salt of an alkyl hydroxy aryl sulfide such as tertiary amyl phenol sulfide and then treat the latter with anhydrous barium bromide to form the corresponding barium salt of tertiary amyl phenol sulfide. In such a case the $CO_2$—$H_2O$ treatment may be applied either to the first-formed salt (i. e. the sodium salt) or to the one formed by double decomposition (i. e. the barium salt) or to both.

When using a basic metal neutralizing agent, the reaction is preferably carried out at a temperature between the approximate limits of 20° C. (or room temperature) and about 200° C., preferably about 90° C. to 175° C. The mixture is preferably stirred during this neutralization reaction, for a sufficient length of time to insure complete reaction, and ordinarily an excess of the basic metal neutralizing agent is used so as to insure incorporation of the metal atom in each molecule of the alkyl hydroxy aromatic compound or sulfide thereof, to produce for example a metal alkyl phenolate or a metal alkyl phenol sulfide, etc.

Now according to a recent improvement, not claimed herein per se, the resultant solution of metal salt in lubricating oil, with or without minor amounts of stearyl alcohol or other additives such as mentioned above, is treated with a weakly acid substance, preferably by blowing the solution with a weakly acid gas such as carbon dioxide, hydrogen sulfide, etc., preferably one whose alkali or alkaline earth salts are insoluble in oil, to reduce the water-sensitivity of the metal salt in the oil. Although such blowing with carbon dioxide, for instance, may effect a substantial benefit when used alone, it is preferable to carry out this treatment in the presence of, or subsequent to a treatment with, a controlled amount of a hydrolyzing agent such as $H_2O$ either in the form of water or steam which is believed to effect a partial hydrolysis of some of the metal salts present. It is to be noted that water itself below its boiling point substantially hydrolyzes the metal salts, but during subsequent drying and finishing operations the hydrolyzed fractions recombine to form water-sensitive material. It is the function of the $CO_2$ to render the metal inactive during finishing operations. Accordingly if the hydrolysis is carried out with water alone at temperatures below the boiling point of water, it is necessary to stop the reaction by treating with $CO_2$ prior to the finishing operation. Although the exact amount or proportion of treating agents such as carbon dioxide and steam undoubtedly must be varied to some extent according to the particular type of metal salt being treated and the way in which it was prepared, ordinarily the amount of carbon dioxide, or other weakly acid gas used, should be less than about 25%, and preferably about 1 to 5%, by weight based on the amount of metal salt in the oil solution being treated. If the proportion of carbon dioxide is calculated on the weight of the entire oil solution being treated then it should be preferably about 0.5% to 2% by weight. Similarly the amount of $H_2O$ should be in the same general range, i. e. less than about 20%, preferably about 1 to 5%, based on the weight of metal salt being treated, and preferably about 0.1 to 2 or 3% by weight based on the total oil solution being treated.

The use of controlled amounts of water or steam provides better control of the product and more uniform results than if the blowing with carbon dioxide is carried out in the absence of any $H_2O$. The amount of water or steam used is important. There is a slight loss of metal content of the metal salt during the treatment with $CO_2$ and $H_2O$ if used simultaneously and that this loss increases with the amount of $H_2O$ used.

After the treatment with carbon dioxide and steam, or equivalent treating agents, the entire mixture is filtered, preferably with the use of a filter aid such as Hyflo, Dicalite or other inert diatomaceous earths or active clays such as, Superfiltrol, attapulgus, bauxite, etc. Usually about 0.05 to 0.25 lb. of filter aid per gallon will give satisfactory improvement in the filtration.

The treatment with carbon dioxide and steam, or equivalent materials, may be carried out by batch operation or continuously, depending upon equipment available and quantity of material being processed. For batch operation the oil solution of the metal salt can be placed in any suitable container such as an open or closed tank, drum or kettle, etc., provided with heating or cooling coils or exchanger and a pipe or other suitable means of passing the carbon dioxide and steam (or water) into the oil-salt solution preferably near the bottom thereof so that the gas bubbling up through the solution will effect suitable agitation. A mechanical agitator may, of course, be provided. After the reaction has been completed the solution should then be discharged from the bottom of the container by gravity or by pressure blowing, or conveyed by any other suitable means such as by pumping, to a filter. On the other hand, for continuous operation several alternative types of equipment may be used, one being an open vertical drum in which the fresh oil-salt solution is fed in at one side either at the surface or at the bottom or at some intermediate height, and the carbon dioxide and steam are blown into the solution near the bottom of the tank either through a pipe fitted to the bottom of the tank or else through a removable pipe which extends from the top of the tank down through the liquid near to the bottom, and the treated solution is then drawn off through a suitable overflow outlet or by a syphon or otherwise. For larger scale continuous operation it is probably best to use a vertical tower which may be of any desired dimensions of height and diameter and may contain packing materials such as rings, etc., or may be equipped with bubble trays and the like or not, in any case the oil-salt solution being fed into the top of the tower and the carbon dioxide and steam or water being fed into the bottom of the tower so that the solution and treating agents will flow countercurrently and the treated solution will be discharged continuously at the bottom of the tower by gravity and residual gases released at the top of the tower. Or the treatment with $CO_2$ and water (or steam) can be conducted either batch or continuous while maintaining a slight pressure of $CO_2$ or steam on the system. Such pressure will improve the solubility of the $CO_2$ and water (or steam) in the oil, resulting in better contact of the liquid and gas and thereby effecting better utilization of the treating agents.

The data in the following table show the effect of various amounts of water in a series of tests in which a solution of 40% of barium tertiary octyl phenol sulfide in oil was treated with a constant amount (10% by weight/hour based on the total solution) of carbon dioxide at 85–90° C. for various periods of time ranging from ½ hour to 3 hours. The barium salt used in this series of tests was made by neutralizing tertiary octyl phenol sulfide in oil solution with barium hydroxide octahydrate at about 120° C. The percent of barium in the treated product, and the water-sensitivity thereof are shown for each concentration of water used and each duration of carbon dioxide blowing. The term "water-sensitivity" is the amount of sediment that settles out from 500 cc. emulsion after 24 hours standing at room temperature when 600 gms. of a (1.0%) solution of the metal salt in oil is contacted with 1% by weight of water and stirred for 15 minutes with a motor-driven egg-beater type of mixer at 80–90° F.; the oil used in these tests was a solvent extracted Mid-Continent lubricating oil base stock of an S. A. E. 20 grade having a viscosity index of about 100.

pound of the sulfide, this being an 8% excess of hydrate over the theoretical amount required for neutralization. The subsequent $CO_2$-steam treatment was carried out at a temperature of about 140° C., using about 1% $CO_2$ and about 1–2% steam, based on the weight of the barium salt being treated.

In the neutralization with barium hydroxide octahydrate it is customary to use amounts of the hydrate in excess of theoretically required quantities for a product of a given barium content in order to facilitate entry of barium into the molecule. The amounts of such excess barium hydroxide employed vary from 5 to 30%, usually 20%. On treatment with $CO_2$ and water or steam, unreacted barium hydrate is converted to barium carbonate which is insoluble and precipitates in extremely fine colloidally dispersed particles which cause some gel formation in the en- Table 1

| Time of treat | ½ Hr. | | 1 Hr. | | 1½ Hrs. | | 2 Hrs. | | 2½ Hrs. | | 3 Hrs. | |
|---|---|---|---|---|---|---|---|---|---|---|---|---|
| | Per Cent Ba | $H_2O$ Sens. | Per Cent Ba | $H_2O$ Sens. | Per Cent Ba | $H_2O$ Sens. | Per Cent Ba | $H_2O$ Sens. | Per Cent Ba | $H_2O$ Sens. | Per Cent Ba | $H_2O$ Sens. |
| Per cent Water added: | | | | | | | | | | | | |
| 0 | 9.49 | 12 | | 9 | 9.54 | 7 | 9.54 | 7 | 9.50 | 7 | 9.50 | 7 |
| Trace | 9.68 | 30 | 9.66 | 7 | 9.56 | 10 | 9.00 | 11 | 9.72 | 11 | 9.66 | 11 |
| 1% | 9.41 | 8 | 9.49 | 5 | 9.44 | 1 | 9.32 | 2 | 9.36 | 2 | 9.25 | 5 |
| 5% | 9.17 | 10 | 7.99 | 5 | 7.74 | 5 | 7.34 | 3 | 7.56 | 2 | 7.61 | 2 |
| 10% | 9.47 | 10 | 7.83 | 7 | | | 6.16 | 2 | 6.31 | 1 | 6.33 | 1 |
| 15% | 9.56 | 65 | 8.44 | 17 | 7.50 | 5 | 6.35 | 1 | 6.98 | 1 | 5.07 | 1 |

Blank sample (no treat). 9.65% barium, 65 cc. $H_2O$ sensitivity (CUG).

The data in the above Table 1 indicate that the greatest or at least the most practical reduction of water-sensitivity is effected with the use of about 1% of added water and a carbon dioxide blowing treatment of about 2 to 2½ hours. If much more water is used or a much longer treating time is used, the loss of barium from the finished product is substantially increased, without any compensating advantage by further decrease in water-sensitivity.

Some plant performance data showing the effect of steam and carbon dioxide treatment of barium tertiary octyl phenol sulfide are given here below:

Table 2

| Water Sensitivity | | Per Cent Ba | |
|---|---|---|---|
| Before $CO_2$-$H_2O$ treatment | After treatment | Before treatment | After treatment |
| Cc. | Cc. | | |
| 32 | 5 | 9.01 | 8.90 |
| 45 | 7 | 9.68 | 9.67 |
| 45 | 3 | 8.97 | 8.91 |

The above Table 2 shows that in commercial operation which was carried out by bubbling a carbon dioxide-steam mixture into the oil-salt solution in a vertical drum into which the fresh solution is fed in at one side near the top and treated solution is discharged by over-flowing at the opposite side, successfully reduced the water-sensitivity from relatively high figures such as 32–45 down to relatively low figures such as 3–7, without effecting more than a trace loss of per cent barium. The metal salt used during the accumulation of the data reported in Table 2 was made by neutralizing tertiary octyl phenol sulfide at about 120° C. with barium hydroxide octahydrate, using about 0.75 lb. of the hydrate per tire mixture. Such mixtures are difficult to filter and in especially aggravated cases will not even "wet" the blotters of a conventional plate and frame press.

It has now been found that these filtration difficulties are largely or completely avoided if the excess of basic metal neutralizing agent used is maintained below that amount which will produce a total of about 2% of precipitated metal carbonate based on the total mixture being treated, or about 5% based on the weight of the metal salt of the alkyl hydroxy aromatic sulfide. The metal carbonate produced probably results from two sources, namely, first and most important, the amount of excess metal neutralizing agent used, and secondly in minor amount that which is believed to result from reaction of carbon dioxide with metal hydroxide thought to be liberated by hydrolysis from metal salts. Such condition is especially aggravated in low temperature treats with large amounts of water present. The metal carbonate obtainable by carbonation of hydrolyzable metal-containing radicals generally only amount to about 0.1% to 0.3% based on the total weight of mixture being treated, or about 0.2% to 0.7% based on the weight of metal salts per se. Thus, even with this carefully controlled neutralization, the amount of metal carbonate resulting from the carbonation of mere excess metal neutralizing agent will be about 0.5 to 1.0% by weight based on the total mixture treated or about 1.0% to 3.0% based on the weight of metal organic salt per se. It is desirable to maintain the amount of metal carbonate resulting from carbonation of mere excess metal neutralizing agent below 10 times the amount of metal carbonate formed by carbonation of metal-containing radicals released by hydrolysis of metal organic salts during the combination $CO_2$-$H_2O$ treatment. Thus it is a primary object of the present invention to control the amount of metal neutralizing agent used so as to prevent the formation of substantial amounts of insoluble, finely divided precipitate, which is particularly gel-forming at low temperatures during the treatment of the metal salts of alkyl hydroxy aromatic sulfides with a weakly acid substance with or without the use of a hydrolyzing agent.

More specifically, according to this invention is has been found that keeping the amount of $BaCO_3$ freshly precipitated below 2% by weight on the total mixture or 5% on the metal salt will insure constant and rapid filtration in the removal of residual solids during the clarification step to produce finished, water-insensitive barium tertiary octyl phenol sulfide.

In the laboratory a 10% by weight master solution of freshly precipitated barium carbonate in a barium tertiary octyl phenol sulfide concentrate (in oil) was prepared by treating at 80–85° C. 80 grams of barium hydroxide octahydrate in 180 grams of barium tertiary octyl phenol sulfide in 300 cc. of mineral lubricating oil and stearyl alcohol with $CO_2$. After sufficient $CO_2$ has been used to convert the hydroxide to carbonate, the blend was heated to 140° C. to remove water. This master blend was heated with previously filtered solutions of barium tertiary octyl phenol sulfide to give solutions containing 1, 2, 3, and 5% barium carbonate on the total weight. Filter rates were determined under controlled conditions by filtering into vacuum flasks using steam-heated Buchner funnels of 9.0 centimeter diameter with filter paper and Hyflo filter aid precoat. The rate per minute was determined for 10 minute intervals or less time if the total charge of 100 grams filtered readily.

| Per Cent $BaCO_3$ on Mixture | On Metal Salt | Grams Filtered per Minute |
| --- | --- | --- |
| 1 | 2.5 | 40. |
| 2 | 5.1 | 2.5 slightly plugged condition. |
| 3 | 7.7 | 1 eventual plug. |
| 5 | 13.0 | Did not wet paper. |

In the plant manufacture of water-insensitive barium tertiary octyl phenol sulfide great difficulty was encountered in filtration of the $CO_2$ treated batches. The amount of excess barium hydrate over theoretical plus barium removed from the barium salt of the sulfurized alkylated phenol when converted to carbonate during the $CO_2$ treating step was sufficient to cause severe filter-plugging conditions. The amount of barium carbonate obtainable from the excess barium hydroxide was equivalent to 1.5–1.6% by weight on the mixture (4.0% on metal salt). Barium carbonate obtainable from barium hydrolyzable by the $CO_2$-$H_2O$ treatment brought the total barium carbonate to 1.8–2.0% on the mixture (5% on metal salt).

Thus in cases where neutralization was effected at 80–90° C. with $CO_2$ treat at same temperature, three out of five batches plugged during filtration.

Charge:

1,820 lbs. sulfide [1]  
3,140 lbs. oil  
350 lbs. stearyl alcohol [2]  
} With (1) 1,390 lbs. barium octahydrate.

[1] Para tertiary octyl phenol sulfide.  
[2] Commercial stearyl alcohol.

From 1,390 lbs. hydrate the amount of octahydrate over that theoretically required represents 87 lbs. potential carbonate which is 1.5% on solution or 3.7% on the metal salt, from 1,330 lbs. the potential carbonate is 40 lbs. or 0.7% on the mixture (1.7% on the metal salt). The barium loss during treat for the batches is given below together with total per cent carbonate which is a summation of excess hydrate as carbonate plus hydrolyzed barium as carbonate. Yield values are corrected to 9.32 theoretical barium, to correct for any oil charging error.

| $Ba(OH)_2 \cdot 8H_2O$, lbs. | Filtration | Per Cent Barium in Product | | Total Per Cent Carbonate | |
| --- | --- | --- | --- | --- | --- |
| | | Before | After | On Mixt. | On Metal Salt |
| 1390 | 20 minutes | 9.36 | 9.20 | 1.6 | 4.0 |
| 1390 | Plug. 1 press | 9.75 | 9.49 | 1.9 | 4.7 |
| 1390 | Plug. 2 press | 9.54 | 8.96 | 2.3 | 5.7 |
| 1390 | 25 minutes | 9.80 | 9.80 | 1.5 | 3.7 |
| 1390 | Plug. did not wet blotters. | [1] 9.32 | 7.80 (Lab finished) | 3.1 | 6.6 |

[1] Estimate.

Subsequent operations, in which the potential barium carbonate is controlled below 1.5% by weight have given no filtration difficulties during one month's operation during which forty batches were processed.

| $Ba(OH)_2 \cdot 8H_2O$, lbs. | Filtration | Per cent Barium in Product | | Total Per cent Carbonate On Mixt. | On Metal Salt |
| --- | --- | --- | --- | --- | --- |
| | | Before | After | | |
| | Minutes | | | | |
| [1] 1330 | 20 | [3] 9.32 | 9.40 | 0.7 | 1.7 |
| [1] 1330 | 40 | [3] 9.32 | 8.90 | 1.3 | 3.2 |
| [2] 1315–1330 | 20–30 | [3] 9.30 | 9.0–9.2 | 0.8–1.2 | 2.0–3.0 |

[1] $CO_2$ treat at 140° C.  
[2] Neutralized at 120° C.; treat at 140° C.; one month's product.  
[3] Calculated.

It is not intended that this invention be limited to any of the specific examples which have been given solely for the purpose of illustration nor unnecessarily by any theory suggested as to the mechanism of the operation of the invention, but only by the appended claims in which it is intended to claim all novelty inherent in the invention as well as all modifications coming within the scope and spirit of the invention.

It is claimed:

1. An improved process for manufacturing metal salts of the products resulting from the reaction of a sulfur halide with alkylated hydroxy aromatic compounds, which comprises neutralizing the reaction product in a mineral lubricating oil solution with a controlled amount of a basic metal compound, thereafter contacting the oil solution containing the neutralized material simultaneously with about 1 to 25% of carbon dioxide and 1 to 20% of water vapor, based on the metal salt present, and finally filtering the same, the amount of said basic metal compound being in excess of that theoretically required for neutralization but not sufficient to produce more than 2% by weight of precipitated colloidally dispersed metallic carbonate, based on the total weight of the reaction mixture, by reaction with the carbon dioxide and water.

2. A process according to claim 1 in which the neutralization is accomplished with a basic compound of an alkaline earth metal.

3. A process according to claim 1 in which the neutralization is accomplished with a basic compound of barium.

4. A process according to claim 1 in which the alkylated hydroxy aromatic compound is an alkylated phenol.

5. A process according to claim 1 in which the alkylated hydroxy aromatic compound is an alkylated phenol and in which the neutralization is accomplished with a basic compound of an alkaline earth metal.

6. An improved process for manufacturing the barium salt of the product resulting from the reaction of a sulfur chloride with tert.-octyl phenol, which comprises neutralizing the reaction product in a mineral lubricating oil solution with a controlled amount of barium hydroxide, thereafter blowing the oil solution with carbon dioxide and steam to the extent that the said oil solution is contacted with about 1 to 25% of carbon dioxide and 1 to 20% of steam, based on the metal salt present, and finally filtering the same, the amount of barium hydroxide being in excess of that theoretically required for neutralization but not sufficient to produce more than 2% by weight of precipitated colloidally dispersed barium carbonate, based on the total weight of the reaction mixture, by reaction with the carbon dioxide and steam.

CARLL F. VAN GILDER.

REFERENCES CITED

The following references are of record in the file of this patent:

UNITED STATES PATENTS

| Number | Name | Date |
|---|---|---|
| 2,294,145 | Winning | Aug. 25, 1942 |
| 2,335,017 | McNab | Nov. 23, 1943 |
| 2,342,099 | Ashley et al. | Feb. 22, 1944 |
| 2,346,826 | Cook et al. | Apr. 18, 1944 |
| 2,356,043 | Finley | Aug. 15, 1944 |